US011813981B2

(12) United States Patent
Vangelov et al.

(10) Patent No.: US 11,813,981 B2
(45) Date of Patent: Nov. 14, 2023

(54) ELECTRIC VEHICLE WITH SELECTABLE VEHICLE PROFILES

(71) Applicant: Ford Global Technologies, LLC, Dearborn, MI (US)

(72) Inventors: John Naum Vangelov, South Lyon, MI (US); Joseph Carl Beiser, Northville, MI (US); James Wilhelm Heaton, Ann Arbor, MI (US)

(*) Notice: Subject to any disclaimer, the term of this patent is extended or adjusted under 35 U.S.C. 154(b) by 945 days.

(21) Appl. No.: 16/548,176

(22) Filed: Aug. 22, 2019

(65) Prior Publication Data

US 2021/0053487 A1 Feb. 25, 2021

(51) Int. Cl.
*B60Q 5/00* (2006.01)
*B60W 50/10* (2012.01)
(Continued)

(52) U.S. Cl.
CPC .............. *B60Q 5/008* (2013.01); *B60K 35/00* (2013.01); *B60W 20/15* (2016.01);
(Continued)

(58) Field of Classification Search
CPC .......... B60Q 5/008; B60Q 9/00; B60K 35/00; B60K 2370/157; B60K 2370/56; B60K 2006/4825; B60K 2370/122; B60K 2370/151; B60K 2370/155; B60K 2370/573; B60K 2370/592; B60K 37/02; B60K 37/06; B60W 20/15; B60W 40/107; B60W 50/10; B60W 2050/0064; B60W 2510/08; B60W 2540/10; B60W 10/08; B60W 10/101; B60W 10/22; B60W 50/0098; B60W 2050/0075; B60W 2050/146; B60W 2556/45; B60W 2720/106; B60W 10/30; B60W 20/10;
(Continued)

(56) References Cited

U.S. PATENT DOCUMENTS 9,147,296 B2 9/2015 Ricci
9,401,056 B2 * 7/2016 Lee ..................... G01M 17/007
(Continued)

FOREIGN PATENT DOCUMENTS

AU 2008100231 A4 5/2008
FR 3001570 A1 * 1/2014

*Primary Examiner* — Maceeh Anwari
(74) *Attorney, Agent, or Firm* — BROOKS KUSHMAN PC; David Kelley

(57) ABSTRACT

A selectable vehicle profile for an electrified vehicle (EV) may be communicated to a vehicle controller to modify vehicle acceleration, generate simulated engine sounds, customize the look and feel of a vehicle instrument cluster/panel display and/or human-machine interface(s) (HMI) (including gages, menus, displays, colors etc.), control transmission simulated shift schedule and feel, control active suspension/ride control, and similar features so that the EV operates to provide a driving experience similar to a previously profiled vehicle, such as a non-electrified vehicle. Vehicle profiles may be generated by an OEM or aftermarket supplier based on actual measurements and/or specifications associated with operation of a particular non-electrified vehicle. The vehicle profile may be licensed for download to the EV, and/or made available through a subscription service, for example.

19 Claims, 3 Drawing Sheets

(51) Int. Cl.
*B60W 40/107* (2012.01)
*B60W 20/15* (2016.01)
*B60K 35/00* (2006.01)
*B60W 50/00* (2006.01)

(52) U.S. Cl.
CPC .......... *B60W 40/107* (2013.01); *B60W 50/10* (2013.01); *B60K 2370/157* (2019.05); *B60K 2370/56* (2019.05); *B60W 2050/0064* (2013.01); *B60W 2510/08* (2013.01); *B60W 2540/10* (2013.01)

(58) Field of Classification Search
CPC ..... B60W 2710/08; B60W 2710/1005; B60W 2710/22; B60W 2710/30; F16H 61/0213; B60Y 2200/91; Y02T 10/62
USPC .......................................................... 701/22
See application file for complete search history.

(56) References Cited

U.S. PATENT DOCUMENTS

| | | | |
|---|---|---|---|
| 10,137,906 B2 | 11/2018 | Chen et al. | |
| 2016/0355193 A1* | 12/2016 | Chen | B60K 35/00 |
| 2017/0103147 A1 | 4/2017 | Khanna et al. | |
| 2020/0247395 A1* | 8/2020 | Strandberg | B60W 30/18136 |

* cited by examiner

ELECTRIC VEHICLE WITH SELECTABLE VEHICLE PROFILES

TECHNICAL FIELD

This disclosure relates to an electrified vehicle having a user-selectable vehicle profile operative to modify multiple vehicle characteristics to appear and/or operate similar to a different vehicle, such as a non-electrified vehicle.

BACKGROUND

Selectable or adjustable vehicle features and settings may be customized and stored in a user profile based on a particular user's preferences. User profiles may be stored in the cloud or on a mobile device and communicated to the vehicle to automate configuration of vehicle features or functions. This facilitates vehicle sharing among multiple users while presenting a consistent vehicle environment or ecosystem without requiring the user to manually adjust or customize the settings and features each time the vehicle is used. Such systems are disclosed in U.S. Pat. Nos. 10,137,906 and 9,147,296, for example.

Electrified vehicles (EV) use of one or more electric motors alone or in combination with an internal combustion engine to power the vehicle and often include transmissions or gear boxes such as a continuously variable transmission (CVT) or power split arrangement that do not include discreet gear ratios associated with conventional manual or automatic transmissions. This results in the ability of EV's to provide relatively constant torque and acceleration profiles that are not as limited by vehicle speed and available engine or wheel torque as traditional vehicle powertrains that rely only on an internal combustion engine and step-ratio transmission. Because of this, both the torque and acceleration profiles for EV's provide a different driving experience than what many people have previously encountered. Driving enthusiasts may enjoy and prefer the experience afforded by a particular traditional non-electrified vehicle that they have previously driven, or a vehicle that has attained historic or iconic status.

SUMMARY

In one or more embodiments, a selectable vehicle profile for an electrified vehicle (EV) may control vehicle acceleration, generate simulated engine sounds, customize the look and feel of the instrument cluster/panel display and/or human-machine interface(s) (HMI) (including gages, menus, displays, colors etc.), control simulated transmission shilling schedule and feel, control active suspension/ride control, and similar features so that the EV operates to provide a driving experience similar to the selected vehicle, such as a non-electrified vehicle. Vehicle profiles may be generated by an OEM or after-market supplier based on actual measurements and/or specifications associated with operation of a particular non-electrified vehicle. The vehicle profile may be licensed for download to the EV, and/or made available through a subscription service, for example.

Embodiments according to the disclosure may include a system comprising a processor in communication with a memory, the processor configured to store in the memory a vehicle profile for controlling an electrified vehicle, the vehicle profile including at least two of a vehicle acceleration profile, a vehicle suspension profile, and an engine sound profile. The processor and memory may be provided by a cloud computer or server, or a mobile device, such as a mobile phone. The system may also include an electrified vehicle comprising an electric machine coupled to a transmission and configured to propel the electrified vehicle, and a controller in communication with a vehicle memory and configured to receive the vehicle profile from the processor, store the vehicle profile in the vehicle memory, and control at least one of the electric machine and the transmission in response to the vehicle profile. In one embodiment, the transmission comprises a continuously variable transmission and the controller controls the electric machine based on the vehicle acceleration profile such that vehicle acceleration simulates acceleration associated with shifting of a step-ratio transmission. The electrified vehicle may include an accelerator pedal, wherein the controller controls the electric machine to provide, for a constant accelerator pedal position, a first acceleration up to a first vehicle speed threshold, a second acceleration for a predetermined time after the first acceleration, and a third acceleration after the predetermined time, wherein the second and third accelerations are less than the first acceleration to emulate the shifting.

In one or more embodiments, the electrified vehicle may include an audio system in communication with the controller, wherein the audio system broadcasts engine sounds based on the engine sound profile to emulate a vehicle having an internal combustion engine. The engine sounds may be based on the accelerator pedal position, transmission gear or state, and/or vehicle speed. Embodiments may also include an electrified vehicle having an internal combustion engine, wherein the controller controls the internal combustion engine speed based on the received engine sound profile to emulate operation of a non-electrified vehicle. The electrified vehicle may include one or more programmable or configurable displays to display vehicle gages presenting information from vehicle sensors, wherein the controller controls arrangement of the vehicle gages on the display based on the vehicle profile to emulate an instrument cluster of a selected non-electrified vehicle. In one embodiment, the electrified vehicle comprises an active suspension system, wherein the controller is configured to control the active suspension system based on the vehicle profile associated with the non-electrified vehicle. In various embodiments, the transmission comprises a continuously variable transmission or a step-ratio transmission. Embodiments having a step-ratio transmission may have the controller configured to control shifting of the step-ratio transmission based on the vehicle profile.

Embodiments may also include a system comprising a vehicle including an electric machine configured to propel the vehicle, a transmission coupled to the electric machine, a display installed in the vehicle, and a controller in communication with the electric machine, the transmission, and the display, the controller configured to wirelessly receive one of a plurality of vehicle profiles each associated with a different model of a non-electrified vehicle and including at least two of an instrument cluster profile, an acceleration profile, and an engine sound profile, the controller also configured to control at least two of the electric machine, the transmission, and the display based on the received one of the plurality of vehicle profiles. The vehicle may also include an internal combustion engine coupled to the electric machine and the transmission. In various embodiments, the vehicle includes an audio system and the controller controls the audio system to broadcast engine sounds based on the engine sound profile, an accelerator pedal position, and vehicle speed to emulate engine sounds of a non-electrified vehicle associated with the received vehicle profile.

In one or more embodiments, the transmission may be a continuously variable transmission (CVT) and the controller may control the electric machine torque based on the acceleration profile to simulate shifting of a step-ratio transmission. For example, the controller may provide a higher acceleration to emulate a lower gear (higher gear ratio) of a step ratio transmission, followed by a short decrease in acceleration for a predetermined time period similar to a torque hole or dip of a conventional transmission gear shift, and then an acceleration higher than the dip, but lower than the first acceleration to emulate or simulate a conventional step-ratio transmission upshift. In these embodiments, the vehicle includes an accelerator pedal and the controller controls the electric machine to provide, for a constant accelerator pedal position, a first acceleration up to a first vehicle speed threshold, a second acceleration less than the first acceleration for a predetermined time after the first acceleration, and a third acceleration greater than the second acceleration and less than the first acceleration after the predetermined time. As such, the second and third accelerations are less than the first acceleration to emulate an upshift. Similarly, the controller may control the electric machine torque in a reverse or opposite fashion to emulate a downshift of a step-ratio transmission.

Embodiments according to the disclosure include a method for controlling an electric vehicle having an electric machine to propel the vehicle, a display configured to display an instrument cluster, an audio system, and a controller configured to control the electric machine, the display, and the audio system. The may include the controller wirelessly receiving a vehicle profile including at least an acceleration profile, an instrument cluster profile, and an engine sound profile of a non-electric vehicle, storing the vehicle profile in a memory, controlling the electric machine based on the acceleration profile, controlling the display to arrange the instrument cluster based on the instrument cluster profile, and controlling the audio system based on the engine sound profile to emulate operation of the non-electric vehicle. The electric vehicle may include an active suspension system wherein the vehicle profile includes a suspension profile of the non-electric vehicle, and the method includes controlling the active suspension system based on the suspension profile. The method may also include controlling the audio system in response to a vehicle accelerator pedal position and/or vehicle speed to simulate or emulate engine sounds of the non-electric vehicle based on the engine sounds profile for similar operating conditions of the electric and non-electric vehicles. The method may also include wirelessly receiving the vehicle profile from a mobile device paired to the controller.

Various embodiments may provide one or more advantages. For example, the capability of an electric vehicle to emulate the look, feel, and operation of a selected non-electric vehicle may provide the opportunity to monetize vehicle profiles by an OEM or after market supplier. Vehicle profiles and corresponding operation of an electric vehicle may allow a customer to experience what it would have been like to drive a previously owned vehicle or a classic or iconic vehicle. Because the profiles are primarily software driven, the profiles can be delivered to the electric vehicle as purchased options or provided on a subscription basis. Libraries of profiles to emulate specific historic or iconic vehicles may be generated and licensed so that customers can experience vehicle performance as well as look and feel of a non-electrified vehicle, which may facilitate adoption of electric vehicle platforms by driving enthusiasts that may otherwise avoid purchasing an electrified vehicle based on the difference in operating characteristics.

The above advantages and other advantages may be recognized by those of ordinary skill in the art based on the following detailed description of one or more embodiments.

DETAILED DESCRIPTION

As required, detailed embodiments are disclosed herein; however, it is to be understood that the disclosed embodiments are merely representative and the claimed subject matter may be embodied in various and alternative forms not explicitly illustrated or described, but understood by one of ordinary skill in the art based on the disclosure. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the claimed subject matter.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed or configured to perform any number of the functions as disclosed.

Figure 1:
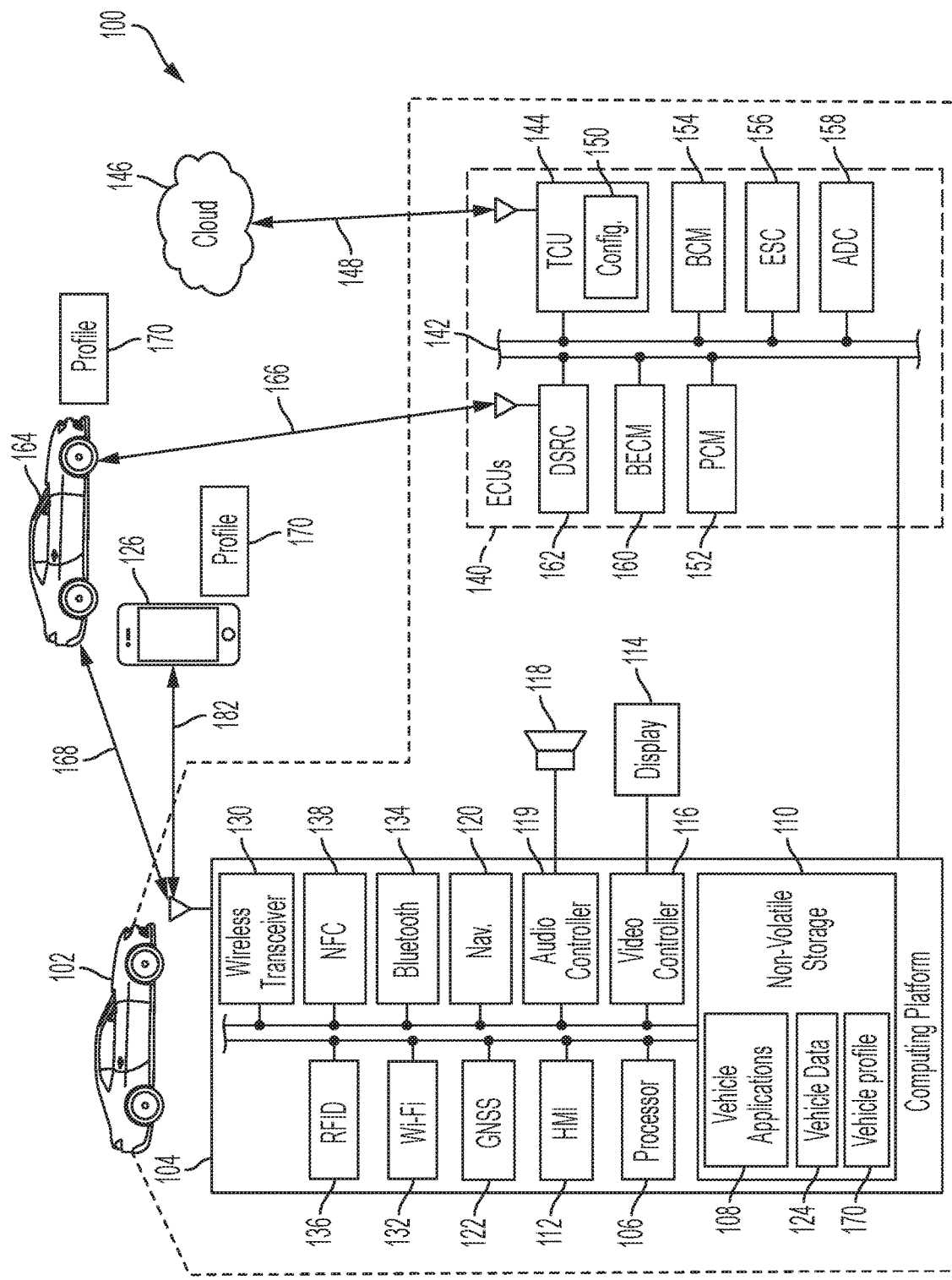
FIG. 1 is a simplified block diagram illustrating operation of various embodiments of a system or method for operating an electrified vehicle to emulate a non-electrified vehicle according to the disclosure.

The present disclosure, among other things, describes a system and method for operating an electrified vehicle based on one of a plurality of selectable vehicle profiles of non-electrified vehicles to emulate the look, feel, performance, and other characteristics of the non-electrified vehicle. FIG. 1 illustrates an example system 100 including a vehicle 102 configured to access one or more cloud servers and/or a mobile device to obtain a previously stored vehicle profile of a non-electrified vehicle 164 having at least two of a vehicle acceleration profile, a vehicle suspension profile, a vehicle instrument cluster or HMI profile, and an engine sound profile. The vehicle 102 generally represents various types of passenger vehicles, such as crossover utility vehicle (CUV or XUV), sport utility vehicle (SUV), truck, recreational vehicle (RV), etc. including driver operated, driver-assisted, and fully autonomous configurations for transporting people or goods. Vehicle 102 may include a computing platform 104 that provides telematics services including, navigation, turn-by-turn directions, vehicle health reports, local business search, accident reporting, and hands-free calling, for example. In one example, vehicle 102 may include the SYNC system manufactured by The Ford Motor Company of Dearborn, MI. It should be noted that the illustrated system 100 is merely an example, and more, fewer, and/or differently located elements may be provided.

In some embodiments, electrified vehicle 102 may be a battery electric vehicle (BEV) powered only by a battery and one or more electric machines that may be operated as a motor/generator selectively drawing power from or charging a high voltage battery (not shown). In other embodiments electrified vehicle 102 may be a hybrid electric vehicle (HEV) powered by an internal combustion engine in combination with one or more electric machines that may each operate as a motor and/or generator. For HEV embodiments, the vehicle may have various powertrain configurations including a series hybrid configuration, a parallel hybrid configuration or a parallel/series hybrid configuration, for example. Vehicle 102 may include various types of transmission or gear box configurations including a powersplit configuration, a continuously variable transmission (CVT), or a step-ratio transmission.

In a hybrid vehicle having a propulsion system with a power split layout, an engine-driven generator may provide electric power to a traction motor that in turn drives the vehicle wheels. It may be advantageous in certain conditions to lock the engine shaft to inhibit rotation, allowing the battery to power both the motor and generator to drive the wheels together. This condition may yield higher torque output and greater capability from the same powertrain. A normally-open selectable one-way clutch that prevents backward rotation of the engine permits the generator to contribute to wheel torque when in the forward gear only. Similarly, a normally-open selectable one-way clutch that selectively prevents forward rotation of the engine permits the generator to contribute to wheel torque in reverse only. A two-way clutch that stops all rotation of the engine would allow both directions of generator torque. A hybrid configuration having an automatic step-ratio transmission is illustrated and described with reference to FIG. 2. Various configurations of an electrified vehicle 102 may also include a battery charger and electric vehicle supply equipment (EVSE) configured to receive power from the electric grid through a plug or wirelessly to charge a vehicle high-voltage traction battery.

As illustrated in FIG. 1, a computing platform 104 may include one or more processors 106 configured to perform instructions, commands, and other routines in support of the processes, functions, or algorithms described herein. For example, the computing platform 104 may be configured to execute instructions of vehicle applications 108 to provide features such as navigation, data processing, and wireless communications to receive a vehicle profile from the cloud or from a mobile device. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read or accessed by the controller or processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL, for example.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more software or hardware buttons (not shown or other HMI controls configured to invoke functions on the computing platform 104 (e.g., steering wheel audio buttons, a push-to-talk button, instrument panel controls, etc.). Similarly, HMI 112 may include one or more video screens or displays to present information from various vehicle sensors to the driver/occupants, such as vehicle speed, outside temperature, cooling system temperature, etc. In one or more embodiments, HMI 112 is configured to display an instrument cluster based on a downloaded and stored vehicle profile corresponding to a non-electrified vehicle. As such, HMI 112 may also include simulated gages, meters, etc. to emulate the corresponding non-electrified vehicle instrument cluster. For example, an electrified vehicle that does not have an internal combustion engine, such as a BEV, may include an engine tachometer displaying simulated engine speed via HMI 112 based on one or more vehicle operating parameters to emulate operation of a non-electrified vehicle corresponding to the selected vehicle profile.

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities, and may be used to display an instrument duster of analog and/or digital gages corresponding to the selected vehicle profile, for example. The computing platform 104 may also drive or otherwise communicate with a vehicle audio system including one or more speakers 118 configured to provide audio output to vehicle occupants by way of an audio controller 119. Various embodiments of the disclosure include an engine sound profile within the non-electric vehicle profile. The processor 106 may control the vehicle audio system to broadcast engine sounds through the speaker(s) 119 based on current vehicle operating parameters or conditions, such as an accelerator pedal position, vehicle speed, and/or transmission actual or simulated gear, for example. In one embodiment, processor 106 controls the vehicle audio system to broadcast engine sounds while the vehicle is in park or neutral to emulate a characteristic or iconic engine idle sound, such as a lopey idle, for example. Engine sounds may also respond to accelerator pedal position to simulate revving of the engine with the vehicle in park or neutral, for example.

The computing platform 104 may also be provided with navigation and route planning features through a navigation controller 120 configured to calculate navigation routes responsive to user input via e.g., the HMI controls 112, and output planned routes and instructions via the speaker 118 and the display 114. Location data that is utilized for navigation may be collected from a global navigation satellite system (GNSS) controller 122 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 124. Navigation software may be stored in the storage 110 e.g. as a part of the vehicle applications 108. Alternatively, navigation software and configuration data (e.g. preferences, saved addresses or the like) may be stored individually within the navigation controller 120 provided with non-volatile storage medium (not shown).

The computing platform 104 may be configured to wirelessly communicate with a mobile device 126 of the vehicle users/occupants via a wireless connection 128 through a wireless transceiver 130. The mobile device 126 may be any of various types of portable computing device, such as cellular phones, tablet computers, smart watches, laptop computers, portable music players, or other device having a processor coupled to a memory and configured for communication with the computing platform 104 to communicate a selected vehicle profile to the vehicle. Mobile device 126 may obtain a selected vehicle profile of a non-electric vehicle from one or more computer servers in the cloud 146 for download to electrified vehicle 102, for example. Alternatively, vehicle computing platform 104 may wirelessly receive a selected vehicle profile directly from the cloud 146. The wireless transceiver 130 may be in communication with a Wi-Fi controller 132, a Bluetooth controller 134, a radio-frequency identification (REID) controller 136, a near-field communication (NEC) controller 138, and other controllers such as a Zigbee transceiver, an IrDA transceiver (not shown), and configured to communicate with a compatible wireless transceiver (not shown) of the mobile device 126.

The computing platform 104 may be further configured to communicate with vehicle controllers that may include various electronic control units (ECUs) 140 via one or more in-vehicle networks 142. The in-vehicle network 142 may include, but is not limited to, one or more of a controller area network (CAN), an Ethernet network, and a media-oriented system transport (MOST), as some examples.

ECUs 140 may include a telematics control unit (TCU) 144 configured to control telecommunication between vehicle 102 and cloud 146 through a wireless connection 148 using a modem (not shown). The cloud 146 may include one or more servers, or computers connected via various types of wired or wireless networks (e.g. the Internet). It is noted that the term cloud is used as a general term throughout the present disclosure and may refer to any cloud-based services involving multiple servers, computers, devices and the like. The TCU 144 may be provided with a local non-volatile storage (not shown) configured to record and store TCU configuration data 150 for the TCU 144. The configuration data 150 may include various data related to the settings of the TCU 144. As a few non-limiting examples, the configuration data 150 may include an identification, network settings to connect to the cloud 146, data package subscriptions, notification preference, vehicle identification data, vehicle profile compatibility data, or the like.

The ECUs 140 may further include a powertrain control module (PCM) 152 configured to monitor and control the powertrain operation of the vehicle 102. For example, the PCM 152 may be configured to control operation of at least one of an electric motor and a transmission to provide vehicle acceleration based on an acceleration profile contained within the vehicle profile to emulate the selected non-electrified vehicle. Settings and user preferences may be stored in a local storage as PCM configuration data or the PCM 152. In one embodiment, PCM 152 controls at least one electric machine for a constant accelerator pedal position to provide a first acceleration until vehicle speed reaches an associated threshold, followed by a second acceleration less than the first acceleration to simulate a torque hole or dip for a small predetermined period of time that may vary based on accelerator pedal position, vehicle speed, and/or simulated gear ratio or gear, followed by a third acceleration greater than the second acceleration but less than the first acceleration to simulate an upshift of a step-ratio transmission in electrified vehicles having a CVT or powersplit configuration. PCM 152 may control the electric machine and/or transmission to provide an opposite acceleration profile to simulate a downshift. In embodiments of electrified vehicles having a step-ratio transmission, PCM 152 may modify a shift schedule or shift feel of the transmission based on the vehicle profile of the non-electrified vehicle. For example, PCM 152 may control apply pressure of one or more clutches in a step-ratio transmission to provide a more aggressive or less aggressive shift feel, or may respond differently to changes in accelerator pedal position to provide a more aggressive or less aggressive pedal response, for example.

The ECUs 140 may further include a body control module (BCM) 154 configured to monitor and control chassis or body operations of the vehicle 102. For example, the BCM 154 may be configured to control and monitor vehicle body functions such as door lock/unlock, vehicle occupancy, blind spot monitoring or the like using signals detected via one or more sensors (not shown). Similarly, configurations for the BCM 154 may be stored as BCM configuration data (not shown) in the BCM 154. In various embodiments, vehicle 102 includes an adjustable or active suspension system or computer ride control. An active suspension system may include adjustable shock absorbers or springs with an actuator or servo controlled by the BCM 154 based on a received vehicle profile. As such, the vehicle profile may be used to control or adjust the active suspension system to modify its character by adjusting shock stiffness, spring rate, ride height, etc. to modify ride performance, drivability and responsiveness based on the selected vehicle profile so that the electrified vehicle 102 has a ride performance that emulates the profiled non-electric vehicle 164.

The ECUs 140 may further include electronic stability controls (ESC) 156 configured to monitor vehicle operation status using signals from the speed sensor (not shown) and control the stability of the vehicle operation whenever needed such as by activating anti-lock brakes (ABS), traction controls or the like based on the selected vehicle profile. Configurations and settings of the ESC 156 may be stored as ESC configuration data in locally in a non-volatile storage medium. The ECUs 140 may further include an autonomous driving controller (ADC) 158 configured to monitor and control the autonomous driving features of the vehicle 102, which may vary based on the particular application and/or the selected vehicle profile. Autonomous driving features may include lane keep assist, distance from other vehicles, adaptive cruise control, hands-off-wheel alert, autobraking, brake mitigation with multiple sensitivity levels or the like. Configurations and settings of the ADC 158 may be stored as ADC configuration data in a non-volatile storage medium.

Figure 2:
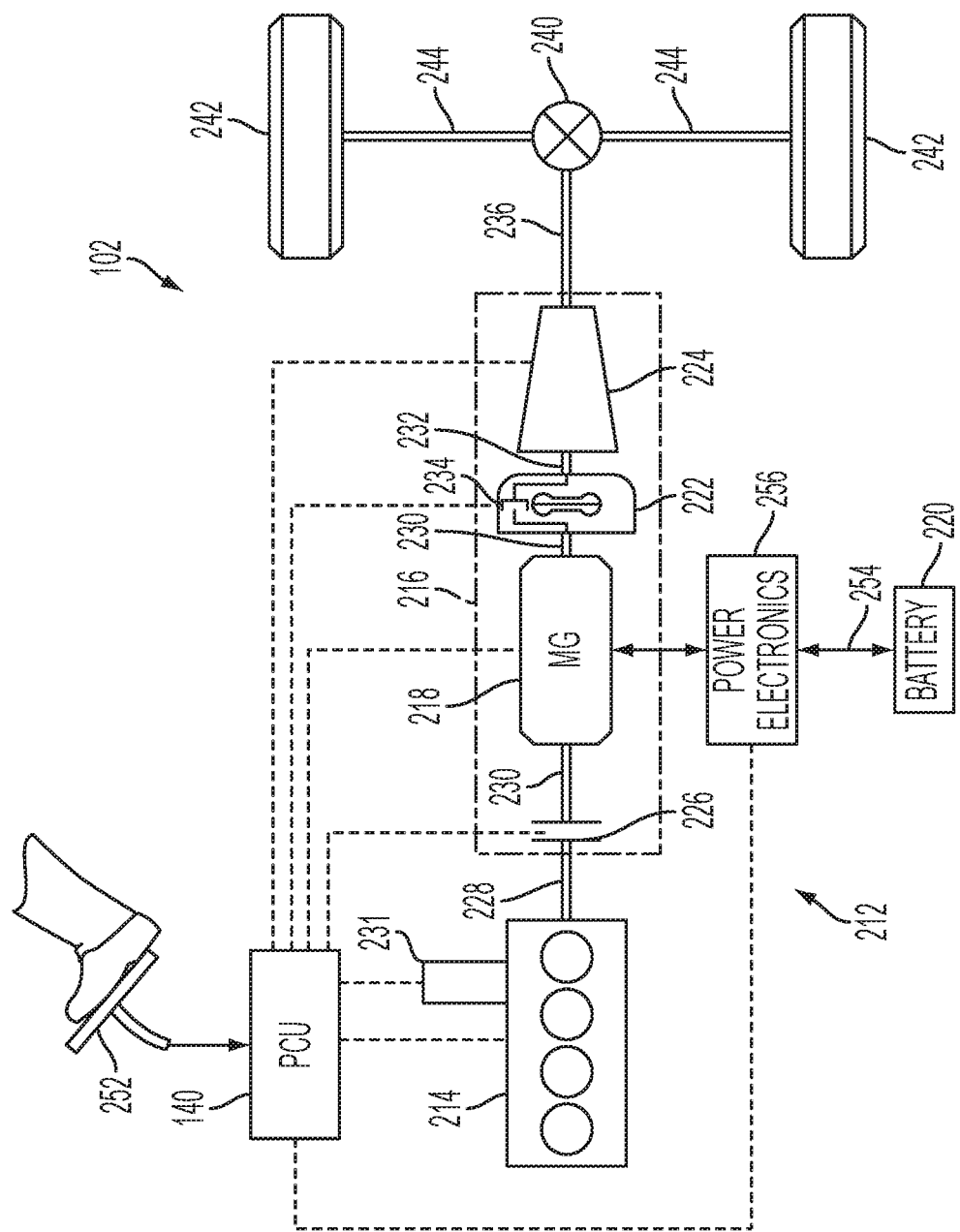
FIG. 2 is a simplified block diagram of an electrified vehicle having an internal combustion engine and step-ratio transmission controlled according to a vehicle profile to emulate operation of a non-electrified vehicle according to various embodiments of the disclosure.

The vehicle 102 may be further provided with a battery electronic control module (BECM) 160 to control cell balancing, charging, discharging, and other operations of a vehicle traction battery (FIG. 2). BECM 160 may be connected to the in-vehicle network 142 and configured to communicate with various ECUs 140 of the vehicle 102 and collect data therefrom. The BECM 160 may be connected to the in-vehicle network 142 via a connecting port such as an OBD-II connector (not shown). Alternatively, the one or more ECUs 140, including BECM 160 may be integrated with the computing platform 104 and communicate with the in-vehicle network 142 directly.

The ECUs 140 may further include a dedicated short-range communication (DSRC) controller 162 configured to wirelessly communicate with compatible controllers of other vehicles or digital entities. For instance, the vehicle 102 may be configured to communicate directly with a compatibly equipped non-electrified vehicle 164 via the DSRC controller 162 through a DSRC link 166 to transfer a vehicle profile. Settings and configurations of the DSRC controller 162 may be stored locally as DSRC configuration data (not shown). Additionally or alternatively, the electrified vehicle 102 may be configured to communicate with the non-electrified vehicle 164 via the wireless transceiver 130 through a wireless connection 168. The non-electrified vehicle 164 may be a vehicle manufactured by the same manufacturer as the vehicle 102 sharing the same or compatible infotainment systems. Alternatively, the vehicle 164 may be made by a different manufacturer but provided with compatible transceivers and software to communicate with the vehicle 102 to sharing data.

In various embodiments, non-electrified vehicle 164 is instrumented to measure various operating characteristics to generate a vehicle profile to be transferred to electrified vehicle 102 to emulate the look, feel, and performance of vehicle 164 as described herein. The generated vehicle profile may be stored in the cloud 146 and subsequently selected for purchase for transfer to vehicle 102 either directly from the cloud 146 or via a mobile device 126 as described herein.

Non-electrified vehicle 164 may include a computing platform similar to computing platform 104, which may be used to generate and store a vehicle profile 170 that includes at least two of a vehicle acceleration profile, a vehicle suspension profile, and an engine sound profile. Various other vehicle configuration profiles may be included within a vehicle profile, such as an instrument cluster profile, accelerator pedal profile, infotainment system profile, lighting profile, powertrain profile, braking profile, etc. Vehicle profile 170 may also include identification, network settings, data package subscriptions, and other settings used by the TCU 144 to connect to the cloud 146.

The vehicle profile 170 may include configurations associated with various controllers. As a few non-limiting examples, the vehicle profile 170 may include PCM profile or configuration data including settings of the PCM 152 to control electric machine torque and speed, engine torque and speed (for hybrids), and powertrain operations such as transmission shifting, clutch pressure control for shift feel, engine start/stop, driving modes, or the like. The vehicle profile 170 may further include the BCM configuration or profile data including settings for door lock/unlock, vehicle occupancy, blind spot monitoring, computer ride control, active/adjustable suspension control and various other functions controlled by the BCM 154. The vehicle profile 170 may further include the ESC configuration or profile data including, settings for traction control, electronic stability control, ABS, electric machine regenerative braking or coast down control, and various other functions controlled by the ESC 156. The vehicle profile 170 may further include the ADC configuration or profile data for the ADC 158 including settings for lane keep assist, distance from other vehicles, adaptive cruise control, hands-off-wheel alert, autobraking, brake mitigation with multiple sensitivity levels or the like. The vehicle profile 170 may further include HMI and/or instrument panel configuration or profile data to control the selection and arrangement of gages, menus, etc. Similarly, the vehicle profile may include BECM configuration or profile data for BECM 160. The vehicle profile 170 may further include the DSRC configuration or profile data for the DSRC controller 162 including settings for connections and identifications. The vehicle profile 170 may further include configuration data from other components of the vehicle 102 that may depend on the particular application and implementation. For example, the vehicle profile 170 may include navigation configuration data from the navigation controller 120 including saved addresses, navigation preferences or the like.

As generally illustrated in FIG. 1, a system or method for controlling an electric vehicle 102 including an electric machine to propel the vehicle (best shown in FIG. 2), an HMI 112 and/or display 114 configured to display an instrument cluster, an audio system having an audio controller 119 and one or more speakers 118, and a controller 140 configured to control the electric machine, the display, and the audio system include wirelessly receiving a vehicle profile 170 including at least an acceleration profile, an instrument cluster profile, and an engine sound profile of a non-electric vehicle 164, storing the vehicle profile 170 in a memory 110, and controlling the vehicle 102 based on the received vehicle profile 170. As illustrated and described in greater detil with reference to FIG. 3, controlling the vehicle may include controlling the electric machine based on the acceleration profile, controlling the display 114 to arrange the instrument cluster based on the instrument cluster profile, and controlling the audio system via audio controller 118 and speakers 119 based on the engine sound profile to emulate operation of the non-electric vehicle 164.

Referring to FIG. 2, a simplified schematic diagram of a representative electrified vehicle 102 is illustrated according to an embodiment of the present disclosure. Although the representative embodiment illustrated in FIG. 2 is a rear-drive hybrid vehicle having a step-ratio automatic transmission, various embodiments include other vehicle configurations of an electrified vehicle as previously described. For example, electrified vehicle 102 may be configured as a parallel hybrid vehicle, a powersplit hybrid vehicle, a battery electric vehicle (that does not include an internal combustion engine), etc. Electrified vehicle 102 may be implemented as a plug-in hybrid electric vehicle (PHEV) such that the traction battery may be charged using power from an external power source, such as the electric grid via a charging plug or wirelessly, i.e. hands-free, contactless, induction charging, etc. Various types of transmissions, transaxles, transfer cases, etc. may be provided for front-drive, rear-drive, or all-wheel-drive configurations. Those of ordinary skill in the art will recognized that the claimed subject matter related to a vehicle profile for an electrified vehicle to emulate a non-electrified vehicle is generally independent of the particular electrified vehicle configuration.

FIG. 2 illustrates representative relationships among the components. Physical placement and orientation of the components within the vehicle may vary. HEV 102 includes a powertrain 212. The powertrain 212 includes a power source or engine 214 that drives an automatic transmission 216, which may be referred to as a modular hybrid transmission (MHT) in some applications. As will be described in further detail below, transmission 216 may include an electric machine such as an electric motor/generator (M/G) 218, an associated traction battery 220, a torque converter 222, and a multiple step-ratio automatic transmission, or gearbox 224 having a predetermined number of discrete gear ratios. The engine 214, M/G 218, torque converter 222, and the automatic transmission 216 are connected sequentially in series.

The engine 214 and the M/G 218 are both drive sources for the electrified vehicle 102. The engine 214 generally represents a power source that may include an internal combustion engine such as a gasoline, diesel, or natural gas powered engine, or a fuel cell. The engine 214 generates an engine power and corresponding engine torque that is supplied to the M/G 218 when a disconnect clutch 226 between the engine 214 and the M/G 218 is at least partially engaged. Engine 214 may be controlled based on the selected non-electrified vehicle profile 170 to operate engine 214 to emulate non-electrified vehicle 164. The M/G 218 may be implemented by any one of a plurality of types of electric machines. For example, M/G 218 may be a permanent magnet synchronous motor. Power electronics condition direct current (DC) power provided by the battery 220 to the requirements of the M/G 218, as will be described below. For example, power electronics may provide three phase alternating current (AC) to the M/G 218. The M/G 218 may be operated based on the vehicle profile to control torque and/or acceleration to provide similar driving performance of the profiled non-electric vehicle 164.

When the disconnect clutch 226 is at least partially engaged, power flow from the engine 214 to the M/G 218 or from the M/G 218 to the engine 214 is possible. For example, the disconnect clutch 226 may be engaged and M/G 218 may operate as a generator to convert rotational energy provided by a crankshaft 228 and M/G shaft 230 into electrical energy to be stored in the battery 220. The disconnect clutch 226 can also be disengaged to isolate the engine 214 from the remainder of the powertrain 212 such that the M/G 218 can act as the sole drive source for the HEV 210. When operating as the sole drive source, an engine sounds profile may be used to broadcast engine sounds through the vehicle audio system so that electrified vehicle 102 provides similar sounds as emulated non-electric vehicle 164.

As illustrated in FIG. 2, shaft 230 extends through the M/G 218. The M/G 218 is continuously drivably connected to the shaft 230, whereas the engine 214 is drivably connected to the shaft 230 only when the disconnect clutch 226 is at least partially engaged.

A separate starter motor 231 can be selectively engaged with the engine 214 to rotate the engine to allow combustion to begin. In one embodiment, the engine 214 is started by the starter motor 231 while the disconnect clutch 226 is open, keeping the engine disconnected with the M/G 218. Once the engine has started and is brought up to speed with the M/G 218, the disconnect clutch 226 can couple the engine to the M/G 218 to allow the engine to provide drive torque.

In another embodiment, the starter motor 231 is not provided and, instead, the engine 214 is started by the M/G 218. To do so, the disconnect clutch 226 partially engages to transfer torque from the M/G 218 to the engine 214. The M/G 218 may be required to ramp up in torque to driver demands while also starting the engine 214. The disconnect clutch 226 can then be fully engaged once the engine speed is brought up to the speed of the M/G.

The M/G 218 is connected to the torque converter 222 via shaft 230. The torque converter 222 is therefore connected to the engine 214 when the disconnect clutch 226 is at least partially engaged. The torque converter 222 includes an impeller fixed to M/G shaft 230 and a turbine fixed to a transmission input shaft 232. The torque converter 222 thus provides a hydraulic coupling between shaft 230 and transmission input shaft 232. The torque converter 222 transmits power from the impeller to the turbine when the impeller rotates faster than the turbine. A torque converter bypass clutch 234 may also be provided that, when engaged, frictionally or mechanically couples the impeller and the turbine of the torque converter 222, permitting more efficient power transfer. The torque converter bypass clutch 234 may be operated as a launch clutch to provide smooth vehicle launch. Alternatively, or in combination, a launch clutch similar to disconnect clutch 226 may be provided between the M/G 218 and gearbox 224 for applications that do not include a torque converter 222 or a torque converter bypass clutch 234. In some applications, disconnect clutch 226 is generally referred to as an upstream clutch and launch clutch 234 (which may be a torque converter bypass clutch) is generally referred to as a downstream clutch.

The gearbox 224 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 232. The gearbox 224 is automatically shifted from one ratio to another based on various vehicle and ambient operating conditions by an associated controller, such as a powertrain control unit (PCU). The gearbox 224 then provides powertrain output torque to output shaft 236.

It should be understood that the hydraulically controlled gearbox 224 used with a torque converter 222 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 224 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 2, the output shaft 236 is connected to a differential 240. The differential 240 drives a pair of wheels 242 via respective axles 244 connected to the differential 240. The differential transmits approximately equal torque to each wheel 242 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 212 further includes an associated controller 140 such as a powertrain control unit (PCU). While illustrated as one controller, the controller 140 may be part of a larger control system and may be controlled by various other controllers throughout the vehicle as illustrated and described with respect to the embodiment of FIG. 1, for example. It should therefore be understood that the control unit 140 and one or more other controllers can collectively be referred to as a "controller" that controls various actuators in response to signals from various sensors to control vehicle functions based on a vehicle profile such that the electrified-vehicle 102 emulates operation of the non-electrified vehicle 162 as described herein.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 2, controller 140 may communicate signals to and/or from engine 214, disconnect clutch 226, M/G 218, launch clutch 234, transmission gearbox 224, and power electronics 256. Although not explicitly illustrated, those of ordinary skill in the art will recognize various functions or components that may be controlled by controller 140 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 226, launch clutch 234, and transmission gearbox 224, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 234 status (TCC), decel or shift mode (MDE), for example.

Control logic or functions performed by controller 140 may be represented by flow charts, block diagrams, or similar diagrams in one or more figures. These figures provide representative control strategies, logic, or algorithms that may be implemented using one or more processing strategies such as event-driven, interrupt-driven, multitasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 140. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 252 is used by the driver of the vehicle to provide a demanded torque, power, or drive command to propel the vehicle. Response to the accelerator pedal position may be modified based on the vehicle profile to provide a more aggressive or less aggressive response associated with a sports car or luxury car, respectively, for example. In general, depressing and releasing the pedal 252 generates an accelerator pedal position signal that may be interpreted by the controller 140 as a demand for increased power or decreased power, respectively, or revving the engine when the transmission is in park or neutral. Based at least upon input from the pedal, the controller 140 commands torque from the engine 214 and/or the M/G 218. The controller 140 may also control the timing and/or feel of gear shifts within the gearbox 224 based on the downloaded vehicle profile, as well as engagement or disengagement of the disconnect clutch 226 and the torque converter bypass clutch 234. Like the disconnect clutch 226, the torque converter bypass clutch 234 can be modulated across a range between the engaged and disengaged positions. This produces a variable slip in the torque converter 222 in addition to the variable slip produced by the hydrodynamic coupling between the impeller and the turbine. Alternatively, the torque converter bypass clutch 234 may be operated as locked or open without using a modulated operating mode depending on the particular application.

It should be understood that the schematic illustrated in FIG. 2 is merely representative and is not intended to be limiting. Other configurations are contemplated that utilize selective engagement of both an engine and a motor to transmit through the transmission based on a received vehicle profile to emulate operation of a non-electrified vehicle. For example, the M/G 218 may be offset from the crankshaft 228, and/or the M/G 218 may be provided between the torque converter 222 and the gearbox 224. Other configurations are contemplated without deviating from the scope of the present disclosure.

Figure 3:
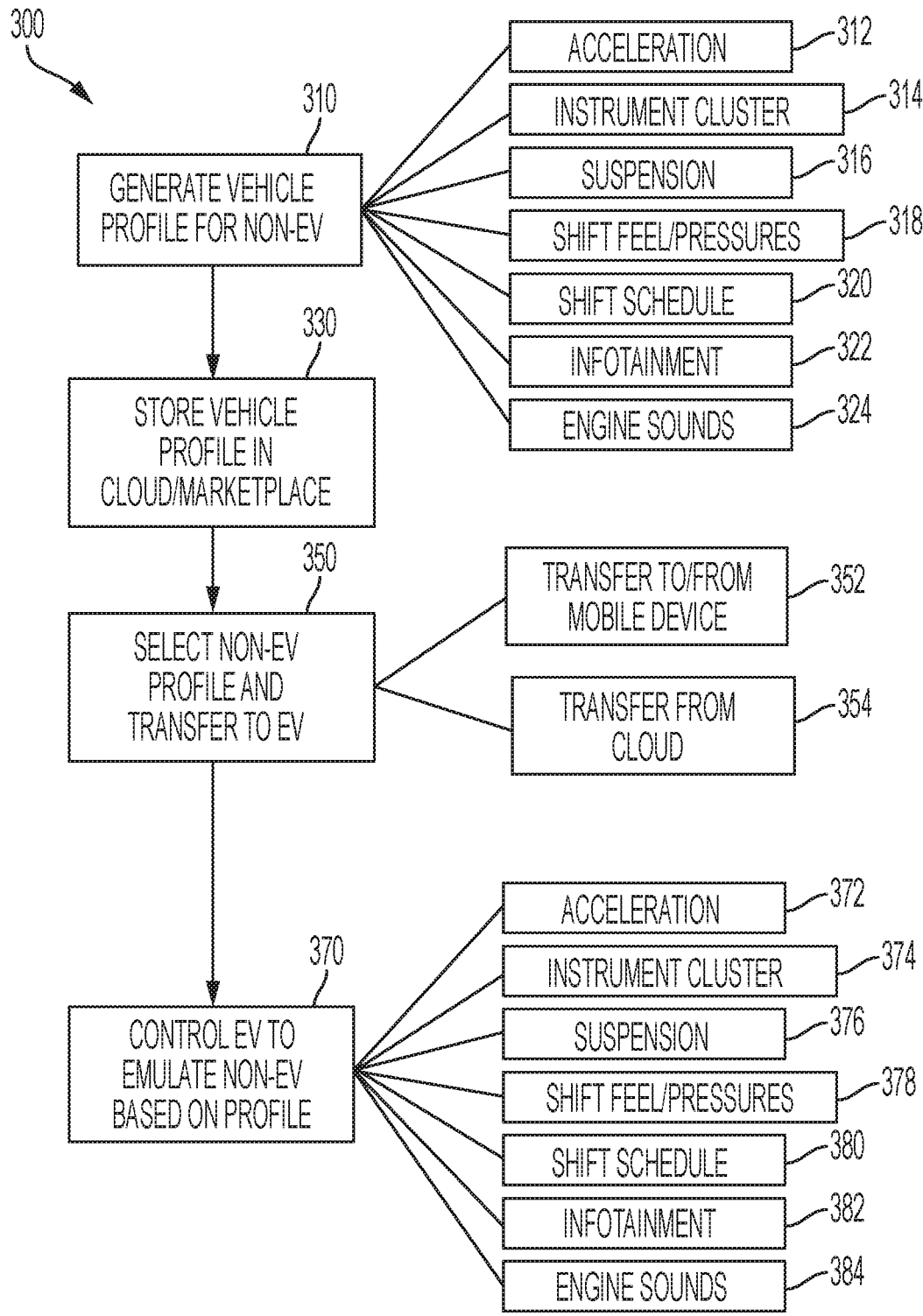
FIG. 3 is a simplified block diagram illustrating operation of a system or method for controlling an electrified vehicle to emulate a non-electrified vehicle according to one or more embodiments of the disclosure.

Referring to FIG. 3, a block diagram 300 illustrating operation of a system or method for controlling an electrified vehicle based on a selected vehicle profile to emulate a non-electrified vehicle is shown. A non-EV profile is generated as represented at 310. The vehicle profile may be generated by operating an instrumented vehicle and recording various vehicle parameters associated with operating and performance characteristics of the non-EV vehicle. Alternatively, or in combination, the non-EV profile may be generated based on vehicle specifications such as vehicle acceleration, transmission shift schedules, engine torque, maximum engine RPM, maximum vehicle speed, and the look and feel of vehicle features such as the instrument cluster, for example. The vehicle profile may include various performance profiles as well as look and feel profiles such as an acceleration profile 312, instrument cluster profile 314, suspension profile 316, transmission shift schedule profile 318, transmission shift feel profile 320, infotainment profile 322, and engine sounds profile 324. The vehicle profile is stored as represented at 330 in a computer readable storage device or non-transitory storage medium. Vehicle profiles for a plurality of vehicles may be created and stored in the cloud by the OEM or a third-party supplier.

A selected vehicle profile may be received as represented at 350. The vehicle profile may be purchased or otherwise obtained from the cloud. The vehicle profile may be received by a mobile device 352 for subsequent transfer to an EV, or may be directly received by a vehicle transceiver or telematics control unit from the cloud 354. In one or more embodiments, the vehicle profile may be wirelessly received as previously described.

The EV is then controlled to emulate the look and feel and/or performance characteristics of a selected non-EV based on the selected vehicle profile as represented at 370. This may include storing the vehicle profile in a vehicle memory and controlling the vehicle based on the stored profile. Vehicle control by one or more vehicle controllers may include controlling an electrified vehicle powertrain, which may include an engine and/or electric machine and transmission to control vehicle acceleration as represented at 372, configuration of a vehicle instrument cluster as represented at 374, control or adjustment of a vehicle suspension system as represented at 376, control of a transmission shift schedule as represented at 378, control of a transmission shift feel (or simulated transmission shift feel) as represented at 380, control or configuration of vehicle infotainment features as represented at 382 and control or simulation of vehicle engine sounds as represented at 384.

While representative embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the claimed subject matter that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a processor in communication with a memory, the processor configured to store in the memory a vehicle profile for controlling an electrified vehicle, the vehicle profile including at least two of a vehicle acceleration profile, a vehicle suspension profile, and an engine sound profile; and
an electrified vehicle comprising:
an audio system;
an electric machine coupled to a transmission and configured to propel the electrified vehicle; and
a controller in communication with a vehicle memory and the audio system and configured to receive the vehicle profile from the processor, store the vehicle profile in the vehicle memory, and control at least one of the electric machine and the transmission in response to the vehicle profile, wherein the audio system broadcasts engine sounds based on the engine sound profile.

2. The system of claim 1 wherein the transmission comprises a continuously variable transmission and wherein the controller controls the electric machine based on the vehicle acceleration profile such that vehicle acceleration simulates acceleration associated with shifting of a step-ratio transmission.

3. The system of claim 2 wherein the electrified vehicle comprises an accelerator pedal and wherein the controller controls the electric machine to provide, for a constant accelerator pedal position, a first acceleration up to a first vehicle speed threshold, a second acceleration for a predetermined time after the first acceleration, and a third acceleration after the predetermined time, wherein the second and third accelerations are less than the first acceleration to emulate the shifting.

4. The system of claim 1 wherein the electrified vehicle comprises an internal combustion engine and wherein the controller controls internal combustion engine speed based on the engine sound profile.

5. The system of claim 1 wherein the electrified vehicle comprises a display configured to display vehicle gages presenting information from vehicle sensors and wherein the controller controls arrangement of the vehicle gages on the display based on the vehicle profile.

6. The system of claim 1 wherein the electrified vehicle comprises an active suspension system and wherein the controller is configured to control the active suspension system based on the vehicle profile.

7. The system of claim 1 wherein the transmission comprises a step-ratio transmission and wherein the controller controls shifting of the step-ratio transmission based on the vehicle profile.

8. The system of claim 1 wherein the processor comprises a mobile phone processor.

9. A system comprising:
a vehicle comprising:
an electric machine configured to propel the vehicle;
a transmission coupled to the electric machine;
a display installed in the vehicle; and
a controller in communication with the electric machine, the transmission, and the display, the controller configured to wirelessly receive one of a plurality of vehicle profiles each associated with a different model of a non-electrified vehicle and including at least two of an instrument cluster profile, an acceleration profile, and an engine sound profile, the controller also configured to control at least two of the electric machine, the transmission, and the display based on the wirelessly received vehicle profile.

10. The system of claim 9 wherein the vehicle further comprises an internal combustion engine coupled to the electric machine and the transmission.

11. The system of claim 9 wherein the vehicle further comprises an audio system and wherein the controller controls the audio system to broadcast engine sounds based on the engine sound profile, an accelerator pedal position, and vehicle speed to emulate engine sounds of a non-electrified vehicle associated with the wirelessly received vehicle profile.

12. The system of claim 11 wherein the transmission comprises a continuously variable transmission and wherein the controller controls electric machine torque based on the acceleration profile to simulate shifting of a step-ratio transmission.

13. The system of claim 12 wherein the vehicle comprises an accelerator pedal and wherein the controller controls the electric machine to provide, for a constant accelerator pedal position, a first acceleration up to a first vehicle speed threshold, a second acceleration for a predetermined time after the first acceleration, and a third acceleration after the predetermined time, wherein the second and third accelerations are less than the first acceleration to emulate the shifting.

14. The system of claim 13 further comprising a mobile device having a processor and a memory wherein the memory stores at least one of the plurality of vehicle profiles and wherein the processor is configured to wirelessly transfer the at least one of the plurality of vehicle profiles to the vehicle.

15. The system of claim 14 wherein the vehicle further comprises an active suspension system and wherein the controller is further configured to control the active suspension system based on the received vehicle profile to emulate a suspension system of the non-electrified vehicle.

16. A method for controlling an electric vehicle including an electric machine to propel the vehicle, a display configured to display an instrument cluster, an audio system, and a controller configured to control the electric machine, the display, and the audio system, the method comprising, by the controller:
 wirelessly receiving a vehicle profile including at least an acceleration profile, an instrument cluster profile, and an engine sound profile of a non-electric vehicle;
 storing the vehicle profile in a memory;
 controlling the electric machine based on the acceleration profile;
 controlling the display to arrange the instrument cluster based on the instrument cluster profile; and
 controlling the audio system based on the engine sound profile to emulate operation of the non-electric vehicle.

17. The method of claim 16 wherein the electric vehicle comprises an active suspension system and wherein the vehicle profile includes a suspension profile of the non-electric vehicle, the method further comprising controlling the active suspension system based on the suspension profile.

18. The method of claim 17 wherein controlling the audio system comprises controlling the audio system in response to a vehicle accelerator pedal position.

19. The method of claim 18 wherein wirelessly receiving comprises receiving the vehicle profile from a mobile device paired to the controller.

\* \* \* \* \*